(12) United States Patent
Miller et al.

(10) Patent No.: US 7,031,085 B2
(45) Date of Patent: Apr. 18, 2006

(54) VERSION TRACKING OF DISK WRITE OPERATIONS

(75) Inventors: Michael H. Miller, Eden Prairie, MN (US); Charles W. Thiesfeld, Lakeville, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 218 days.

(21) Appl. No.: 10/125,285

(22) Filed: Apr. 18, 2002

(65) Prior Publication Data

US 2003/0133214 A1   Jul. 17, 2003

Related U.S. Application Data

(60) Provisional application No. 60/349,312, filed on Jan. 16, 2002.

(51) Int. Cl.
*G11B 5/09* (2006.01)
(52) U.S. Cl. ............................. 360/48; 360/55; 360/53; 360/40; 360/49; 360/54; 360/48
(58) Field of Classification Search .................. 360/48; 702/185
See application file for complete search history.

(56) References Cited

U.S. PATENT DOCUMENTS

| | | | |
|---|---|---|---|
| 5,345,575 A | 9/1994 | English et al. | 395/425 |
| 5,524,129 A | 6/1996 | Pettigrew et al. | 377/6 |
| 5,664,187 A | 9/1997 | Burkes et al. | 395/621 |
| 5,682,513 A | 10/1997 | Candelaria et al. | 395/440 |
| 5,689,678 A | 11/1997 | Stallmo et al. | 395/441 |
| 5,719,717 A * | 2/1998 | Leonhardt et al. | 360/48 |
| 5,729,397 A | 3/1998 | Ottesen et al. | 360/69 |
| 5,787,459 A | 7/1998 | Stallmo et al. | 711/112 |
| 5,796,543 A * | 8/1998 | Ton-That | 360/77.08 |
| 5,828,583 A * | 10/1998 | Bush et al. | 702/185 |

(Continued)

*Primary Examiner*—David Hudspeth
*Assistant Examiner*—Natalia Figueroa
(74) *Attorney, Agent, or Firm*—Westman, Champlin & Kelly (57) ABSTRACT

The present invention is a disc drive storage unit incorporating novel apparatus, data structure and method for uniquely identifying data written during each write command operation of the disc drive storage unit. The disc drive storage unit attaches unique write identification data (sequence data, time data, or both) to host computer data written during each sector write operation. The unique write identification data is attached through independent action of the disc drive storage unit. The unique write identification data is attached to the host computer data in such a way that the unique write identification data is transparent to the host computer. The data structure relates the host computer data to the unique write identification data. The method documents the manner in which unique identification data is attached to, and detached from, the host computer data.

9 Claims, 6 Drawing Sheets

U.S. PATENT DOCUMENTS

| | | | |
|---|---|---|---|
| 5,832,515 A | 11/1998 | Ledain et al. | 707/202 |
| 5,889,935 A | 3/1999 | Ofek et al. | 395/182.04 |
| 5,901,327 A | 5/1999 | Ofek | 395/825 |
| 5,930,823 A | 7/1999 | Ito et al. | 711/152 |
| 5,943,688 A | 8/1999 | Fisher et al. | 711/162 |
| 5,991,775 A | 11/1999 | Beardsley et al. | 707/205 |
| 5,996,054 A | 11/1999 | Leadain et al. | 711/203 |
| 6,052,797 A | 4/2000 | Ofek et al. | 714/6 |
| 6,148,383 A | 11/2000 | Micka et al. | 711/162 |
| 6,269,410 B1 | 7/2001 | Spasojevic | 710/5 |
| 6,269,431 B1 | 7/2001 | Dunham | 711/162 |
| 6,289,398 B1 | 9/2001 | Stallmo et al. | 710/5 |
| 6,295,176 B1 * | 9/2001 | Reddy et al. | 360/48 |
| 6,366,987 B1 | 4/2002 | Tzeinic et al. | 711/162 |
| 6,441,980 B1 * | 8/2002 | Baron et al. | 360/48 |
| 2001/0037475 A1 | 11/2001 | Bradshaw et al. | |

\* cited by examiner

VERSION TRACKING OF DISK WRITE OPERATIONS

CROSS-REFERENCE TO RELATED APPLICATION

This application claims priority from U.S. Provisional Application No. 60/349,312 filed on Jan. 16, 2002 for inventors Michael H. Miller and Charles W. Thiesfeld and entitled "VERSION TRACKING OF DISK WRITE OPERATIONS".

FIELD OF THE INVENTION

The present invention relates generally to data storage systems, and more particularly but not by limitation to version tracking of disk write operations on random access, sector-based memory storage devices.

BACKGROUND OF THE INVENTION

Memory storage systems for computer systems have a long and illustrious history. Like so much of modern technology, the modern electronic devices were preceded by early mechanical renditions. Among the first successful storage media were punch cards. Introduced to program Jacquard looms, the modern punch card was developed into the form of the Hollerith card and used to encode the results of the 1890 United States census. One of the disadvantages to the punch card was that its relatively low information capacity required the use of numerous cards. The sheer number of cards necessitated fairly complex handling mechanisms. Punched tape simplified handling the storage media. A single roll of tape could be punched, its length tailored to the data capacity required, to replace a stack of punch cards.

The advent of the electronic computer spurred the development of other memory storage systems. Several varieties of magnetic tape storage were introduced. Despite physical differences, they all retained the serial nature of the earlier paper punch tapes. Data was written and accessed in a fixed sequential order. If the information to be recovered was at the opposite end of the tape, it was necessary to spool through the entire length of the tape until the tape location of interest was near the write/read head.

Technologies have been developed which eliminated this serial data access and permitted random access to any piece of data at any time. Varieties of Random Access Memory (RAM) and Read Only Memory (ROM) preserve information within integrated circuits. Other varieties of memory include floppy discs, magnetic hard drives, optical hard drives and optical discs (DVD, RO and R/W). The vast majority of data stored in memory storage units is held in magnetic hard drives, optical hard drives, and optical discs.

There are several reasons for keeping track of when data is written to a memory storage device. Such information may help recover data after a hardware failure within the memory storage device. It may also be of benefit in analyzing memory system failures such as data written to the wrong place. An additional use is auditing files for data tampering or other security issues.

Embodiments of the present invention address these and other problems, and offer other advantages over the prior art.

SUMMARY OF THE INVENTION

The present invention addresses the aforementioned problems by providing a novel method and apparatus for attaching sequence data, time data, or both, to data written during each sector write operation. The sequence and/or time data is attached through independent action of the memory storage device. The embodiments illustrated in this application relate to any disk drive storage device.

In one embodiment of the invention, the memory storage device increments a counter once for each write command received. The counter data is attached to the user data in such a way that the counter data is transparent to the user.

In another embodiment, the memory storage device increments a clock once for each time period. A time period may be a second or some other reasonably brief measure. The clock data is attached to the user data in such a way that the clock data is transparent to the user. In one variation of this embodiment, the memory storage device may increment a counter once for every write command that is received during a single clock count.

Other features and benefits that characterize embodiments of the present invention will be apparent upon reading the following detailed description and review of the associated drawings.

BRIEF DESCRIPTION OF THE DRAWINGS

FIG. 2-1 is a block diagram illustrating appending a counter value to the user data in accordance with some embodiments of the present invention.

FIG. 2-2 is a block diagram illustrating recovering the user data written to a disc drive in accordance with some embodiments of the present invention.

DETAILED DESCRIPTION OF ILLUSTRATIVE EMBODIMENTS

Figure 1:
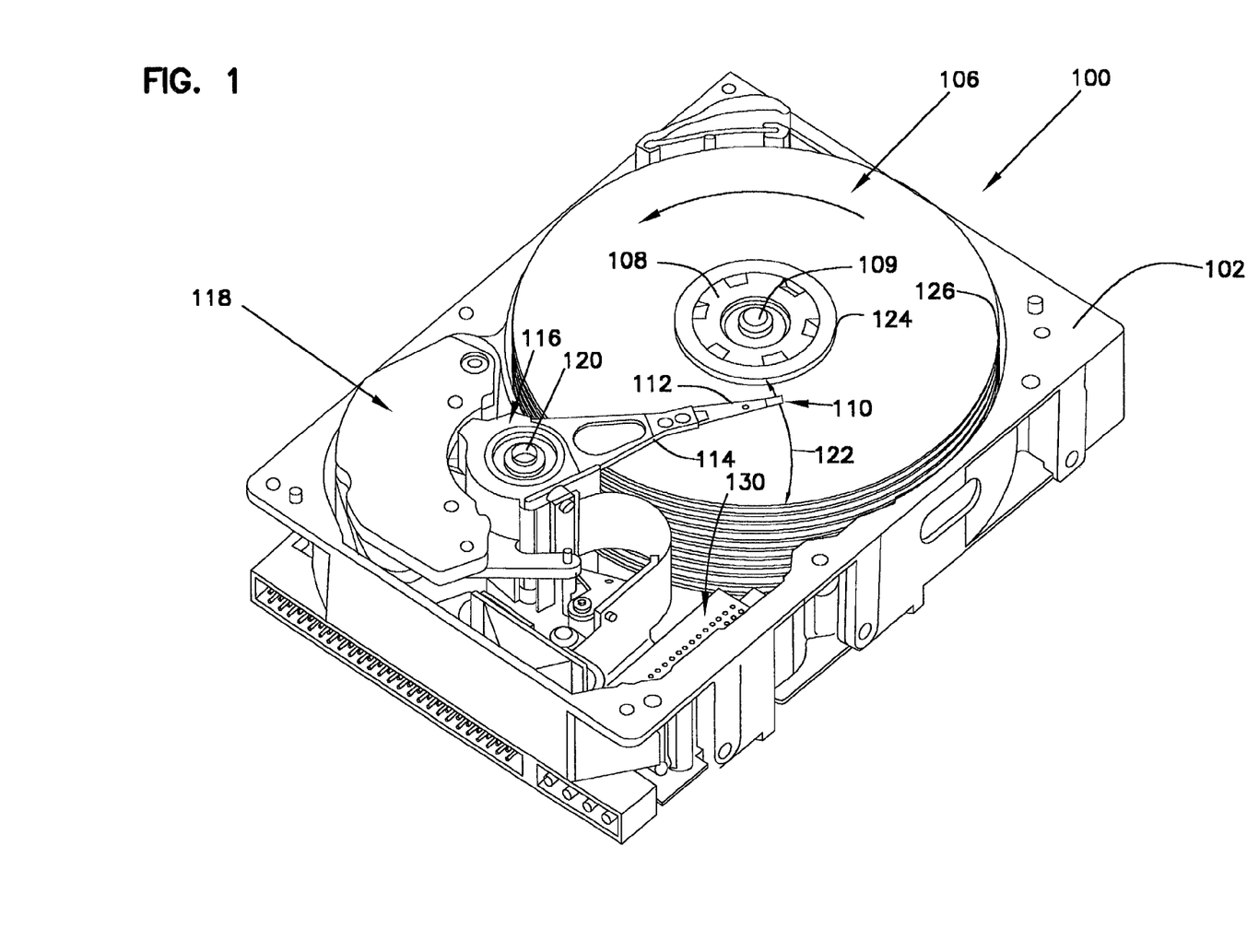
FIG. 1 is an isometric view of a disc drive.

FIG. 1 is an isometric view of a disc drive 100 in which embodiments of the present invention are useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation about central axis 109. Each disc surface has an associated data head 110 which is mounted to disc drive 100 for communication with the disc surface. In the example shown in FIG. 1, heads 110 are supported by suspensions 112 which are in turn attached to track accessing arms 114 of an actuator 116.

The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126. Voice coil motor 118 is driven by control electronics 130 based on signals generated by heads 110 and a host computer (not shown).

To write data to a disc, the control electronics 130 receives data to be written to the disc from a host computer, and the servo system moves the data head to a desired track on the disc. The data is processed by control electronics 130 and provided, as a write signal, to data head 110 which writes the data to the disc. To read data from the disc, control electronics 130 receives a read request from the host, and the servo system seeks to the desired track and sector on the disc. The data head 110 generates a read signal indicative of the data on the disc surface and provides the read signal to the control electronics 130. Control electronics contains a read channel that extracts the data from the read signal so it can be provided to the host.

In accordance with one embodiment of the present invention, each write operation is uniquely identified (as against all other write operations) by an identifying value that is written to the disc surface with the data. The identifier can take one of a variety of forms.

Figure 21:
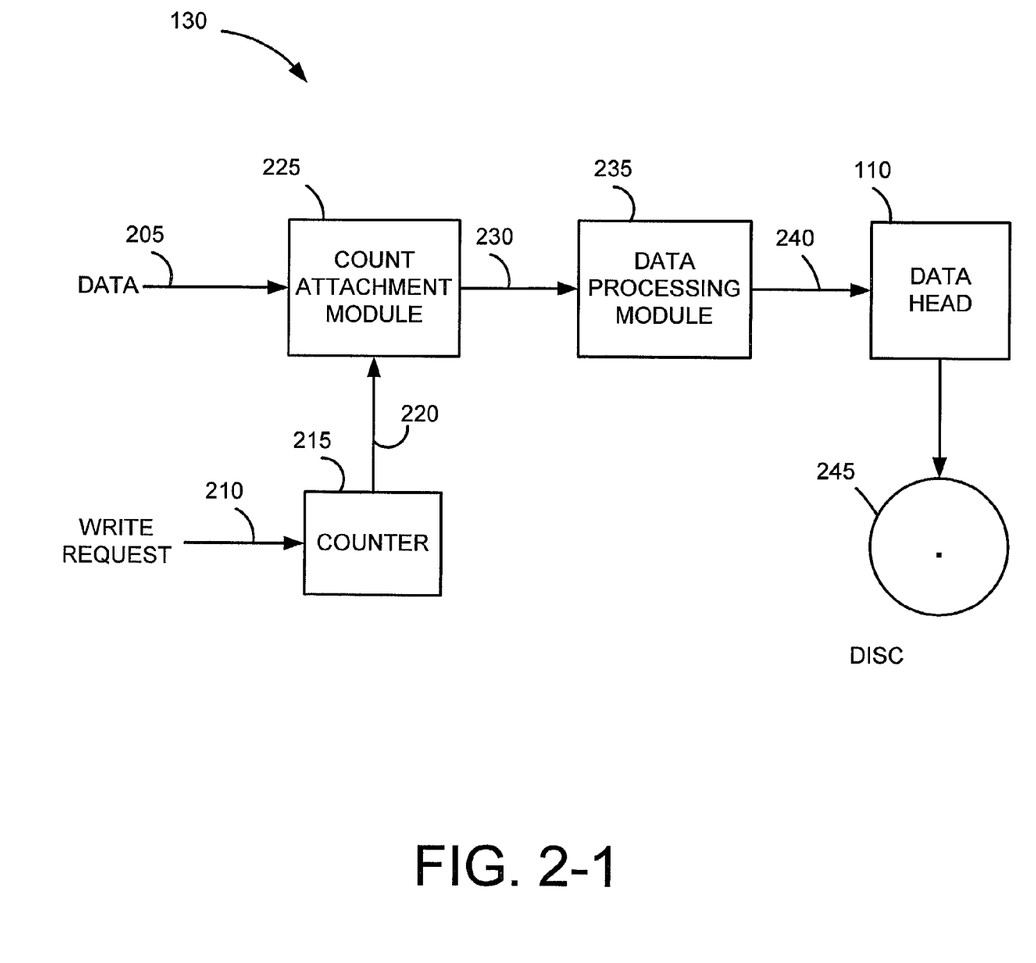

FIG. 2-1 is a block diagram illustrating appending a counter value to the user data in accordance with one embodiment of the present invention. FIG. 2-1 shows a portion of control electronics 130 in greater detail. Control electronics 130 includes counter 215, count attachment module 225, data processing module 235, data head 110 and a disc 245 which is one of discs 106. Data 205 is provided to the control electronics 130 in disc drive 100 by the host computer along with write request 210. Counter 215, is nonvolatile and, increments once for each write request 210 it receives. Counter 215 may be initialized at media format time or upon manufacture.

Counter 215 outputs a signal indicative of the current counter value 220. For any media write command, this count value is always the incremented nonvolatile value. Count attachment module 225 attaches the current counter value 220 to data 205 received from the host. Attached data 230 is output from count attachment module 225 into data processing module 235. Data processing module 235 prepares attached data 230 for writing to disc 250 by encoding it and adding error detection information including, if desired, Error Correction Codes (ECC). Processed data 240 is sent to data head 110. Data head 110 uses techniques well known by persons of ordinary skill in the art to write processed data 240 to disc 245. The count is imbedded in the data written to the media for each sector of the command. Where exactly the count resides can vary as desired and one embodiment is discussed below with respect to FIG. 5.

Figure 22:
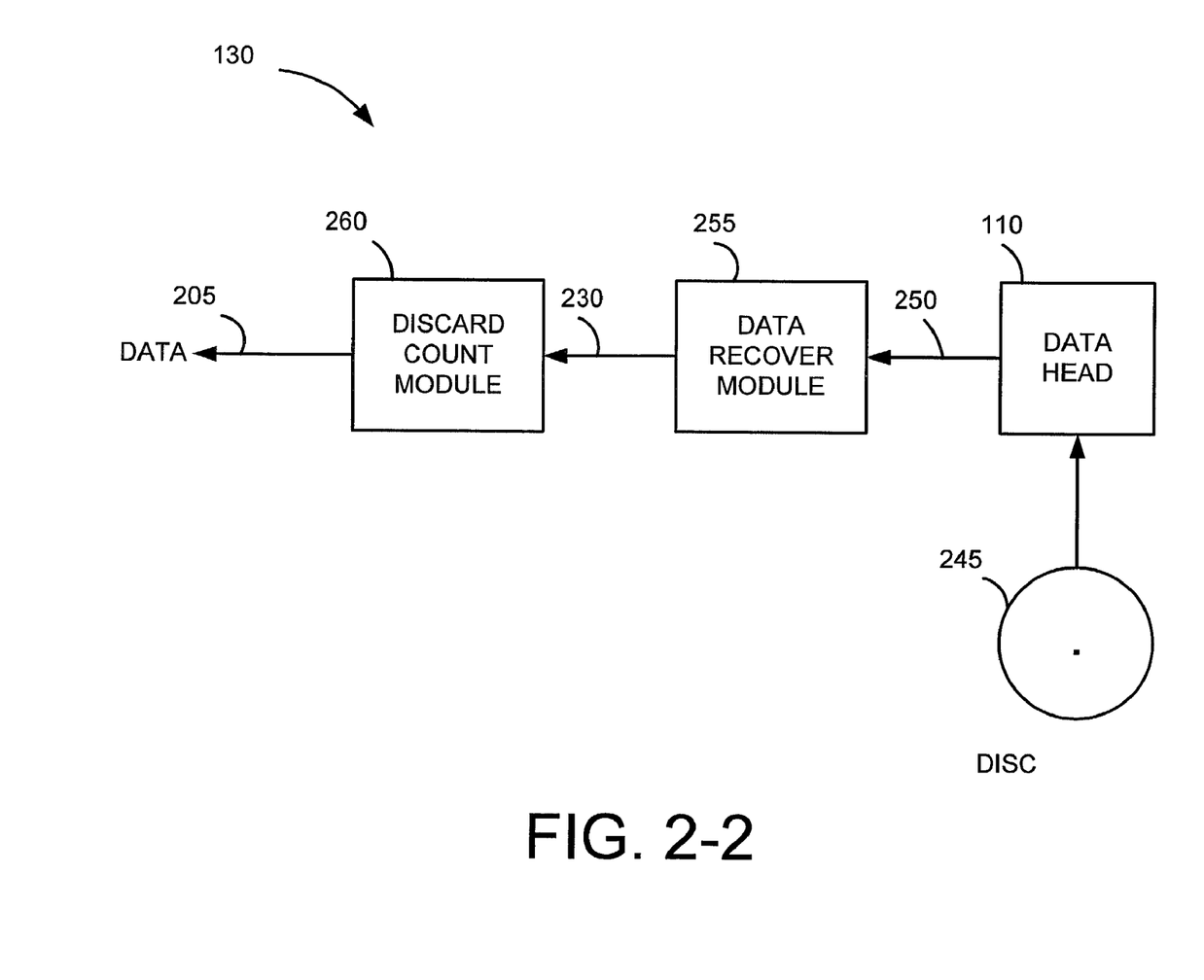

Data is recovered from the memory storage device by following a process roughly the opposite of that used to store the information. This is shown in FIG. 2-2. Read data 250 is read from disc 245 by the data head 110 using techniques well known by persons of ordinary skill in the art. Data head 110 passes the read data 250 to data recover module 255. Data recover module 255 separates attached data 230 from read data 250 and passes it on to discard count module 260. Discard count module 260 separates current counter value 220 from data 205 and discards current counter value 220. Alternatively, the count value can be stored, if desired. Current counter value 220 is thus illustratively transparent to any interface command except for either a special 'manufacturer' read command or a SCSI 'Read Long' command. Data 205, stripped of current counter value 220, is passed on to the host system that requested it.

In an alternative embodiment, the count value may be split into two sections. One section of the count value is unique for each power on sequence (i.e., it is incremented each time the drive goes through the power-up sequence) and is stored in nonvolatile memory. The second section of the count value is incremented for each write command. In that case, the write command counter need not be nonvolatile.

Figure 3:
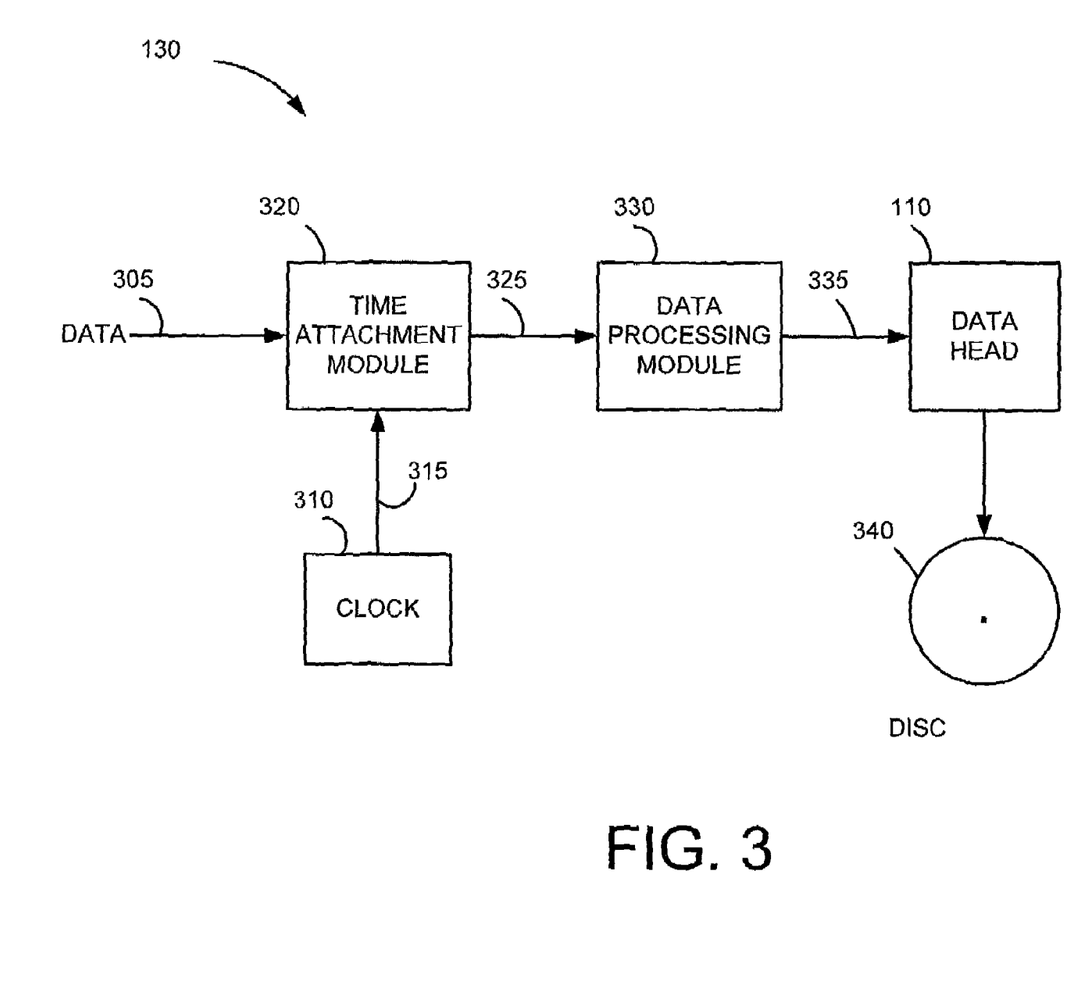
FIG. 3 is a block diagram illustrating appending a clock value to the user data in accordance with some embodiments of the present invention.

FIG. 3 is a block diagram illustrating appending a clock value to the user data in accordance with another embodiment of the present invention. In the embodiment shown in FIG. 3, control electronics 130 is similar to that shown in FIG. 2-1 except that counter 215 and count attachment module 225 are replaced by clock 310 and time attachment module 320. Data 305 is received from the host as described with respect to FIG. 2-1. Clock 310 is illustratively nonvolatile and is incremented once for each second of time or other reasonable time period. The size of the clock counter can vary. For example, a 32 bit second counter will not repeat for approximately 136 years. Clock 310 could be initialized at manufacture time or format time, or it could represent power-on time, time since Jan. 1, 2000 at midnight (for example) or time since the last format, or another suitable start time.

Clock 310 outputs a signal representative of the current clock value 315. Time attachment module 320 attaches current clock value 315 to data 305. Attached data 325 is output from time attachment module 320 into data processing module 330. Data processing module 330 prepares attached data 325 for writing to disc 340 as described above. Processed data 335 is sent to the data head 110. Data head 110 uses techniques well known by persons of ordinary skill in the art to write processed data 335 to disc 340. The clock value is imbedded in the data written to the media for each sector in the same way as described with respect to FIG. 5.

One advantage of this embodiment is that the write version tracking number can be easily correlated to file time stamps, such as file modified time stamps commonly recorded in file system directory records.

Data is recovered from the memory storage device, and the time marking is discarded, by following similar techniques to those for recovering data and discarding the count value, as detailed above.

Figure 4:
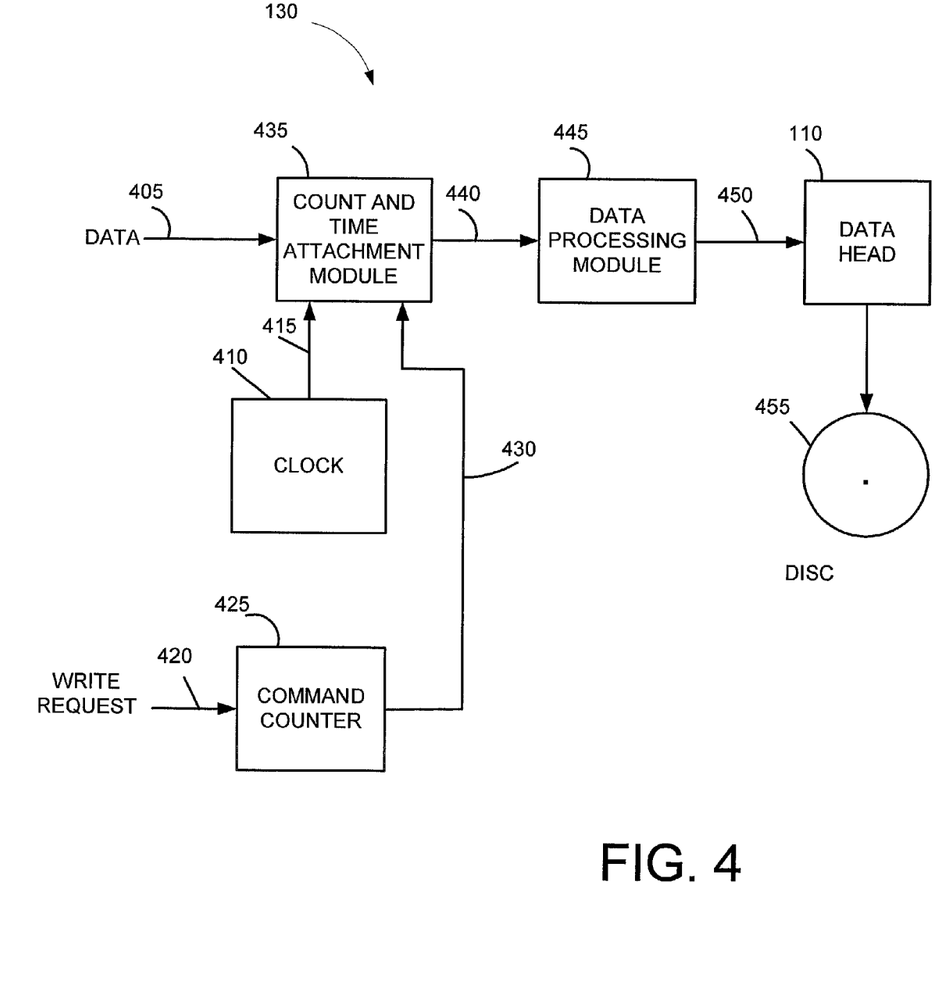
FIG. 4 is a block diagram illustrating appending a clock value to the user data while saving a counter value in accordance with some embodiments of the present invention.

Another embodiment of the present invention is shown in FIG. 4. In the embodiment shown in FIG. 4, control electronics 130 is similar to that shown in FIG. 3 except that time attachment module 320 is replaced by count and time attachment module 435, and command counter 425 has been added. Data 405 is received from the host as described above. Clock 410 increments once for each second or other reasonable period of time. Clock 410 outputs a signal indicative of the current clock value 415.

A Write Request signal 420 is applied to the unit at the same time as user data 405 to be written to the disc surface. Command counter 425 is incremented once for each write request that is received within a second (or within the minimum time unit of clock 410), since it is likely that more than one write command will occur within that time period. Command counter 425 is reset each time clock 410 advances by its minimum time unit (e.g., command counter 425 is reset each time clock 410 ticks off a second). Therefore, command counter 425 may be kept in volatile space. Current counter value 430 is output to count and time attachment module 435.

Count and time attachment module 435 attaches current clock value 415 and current counter value 430 to data 405. Attached data 440 is output from count and time attachment module 435 into data processing module 445. Data processing module 445 prepares attached data 440 for writing to the storage disc as described above. Processed data 450 is sent to the data head 110. Data head 110 uses techniques well known by persons of ordinary skill in the art to write processed data 450 to disc 455.

Data is recovered from the memory storage device, and the count marking and time marking are discarded, by following similar techniques to those detailed above.

In another embodiment, the upper bits of the clock counter are used to make the count unique for each command.

Example:

| | |
|---|---|
| first write of second 0x00341244 | Count written-0x00341244 |
| first write of second 0x00341245 | Count written-0x00341245 |
| second write of second 0x00341245 | Count written-0x80041245 |
| third write of second 0x00341245 | Count written-0x80141245 |
| fourth write of second 0x00341245 | Count written-0x80241245 |
| first write of second 0x00341246 | Count written-0x00341246 |

In this example 20 bits of the absolute time are not changed. Thus, this section would wrap every 12.1 days. Eleven bits are used to count the number of write commands in each second. This section would wrap if more than 4096 write commands per second were issued. Finally 1 bit is used to indicate whether this is an absolute time count or a split count. The absolute count in this example would restart in 68 years of continuous run time.

Figure 5:
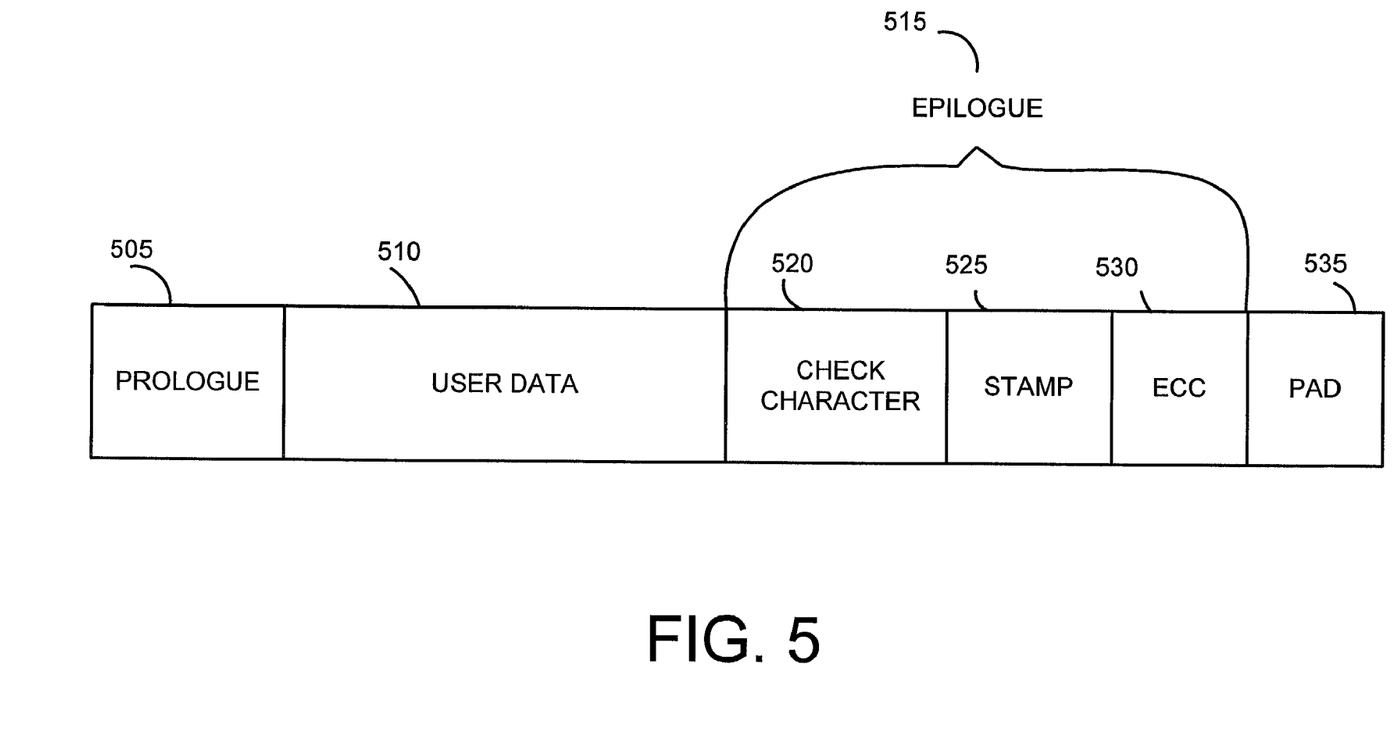
FIG. 5 is an organizational layout of the data stored in a disc sector in accordance with one embodiment of the present invention.

FIG. 5 is an organizational layout of a disc sector holding the encoded data in accordance with one embodiment of the present invention. As shown in FIG. 5, the sector includes three fields. Prologue field 505 contains a gap, an index and other known information. User data field 510 contains the encoded user data to be stored. Epilogue field 515 may be divided into a plurality of additional fields. Examples include check character field 520, stamp field 525, ECC field 530, and pad area 535. Check character field 520 is known and includes for example, checksum data or the like. Stamp field 525 illustratively contains the write identifier information described above. ECC field 530 is also known and includes error correction code information. Pad area 535 is not a field as much as a buffer area between epilogue 515 of one sector and prologue 505 of the next sector to be written to the storage disc.

Alternative embodiments of the present invention place the unique write identifier within the prologue (prepending as opposed to appending) or within the pad field. Difficulties associated with attaching the unique write identifier to the pad field include the limited size of the pad field and the risk of losing data written within the pad field as the gap to the following prologue shrinks.

The present invention can be summarized in reference to the figures. In some embodiments a method of storing data (as in 205, 305) on a disc (as in 106) in a disc drive (as in 100), the method comprises receiving data (as in 205, 305) to be written to the disc (as in 106) during a write operation. The embodiments also include combining a write operation sequence indicator (as in 525) with the data (as in 205, 305) to obtain a complex data sequence (as in 230), generating, on the disc drive (as in 100), the write operation sequence indicator (as in 525) uniquely identifying the write operation as against all other write operations performed on the disc (as in 100) (as in 220). The embodiments also include writing the complex data sequence to the disc (as in 106) (as in 245).

Some embodiments further include incrementing a write operation counter once for each write command which is received (as in 215).

An embodiment further includes incrementing a power-on counter once for every time the disk drive (as in 100) is powered on.

Some embodiments further include incrementing a clock once for each reasonable time period (as in 310).

An embodiment further includes incrementing a write command counter (as in 425) once for each write command which is received during a single increment of the clock (as in 410).

Some embodiments further include reading the complex data sequence from the disc (as in 106) (as in 260). Some embodiments additionally include separating the write operation sequence indicator (as in 525) from the complex data sequence, yielding the data originally written to the disc drive (as in 100) (as in 275). Some embodiments additionally include transmitting the data read from the disc (as in 106) during a read operation (as in 205).

In some embodiments a computer-readable medium (as in 106) has stored thereon a data structure, that comprises a first field including data representing a prologue (as in 505), a second field including data representing user data (as in 510), a third field including data representing an epilogue containing epilogue data (as in 515), and a write operation sequence indicator (as in 525) located in one of the prologue (as in 505) and epilogue (as in 515). The embodiments also include that the epilogue (as in 515) includes a pad area (as in 535) and wherein the write operation sequence indicator (as in 525) is located in the pad area (as in 535).

Some embodiments further include a fourth field including data representing check characters (as in 520).

Some embodiments further include a fifth field including data representing an error correcting code (as in 530) and a sixth field including data representing a pad area (as in 535).

Some embodiments further include the third field containing data representing a write operation sequence indicator (as in 525) is within the first field.

Some embodiments further include the third field containing data representing a write operation sequence indicator (as in 525) is between a fifth field containing data representing an error correcting code (as in 530) and a sixth field containing data representing a pad area (as in 535).

In some embodiments disc drive storage unit comprises, a sequence identification generator (as in 215), a sequence identification/user data attachment component (as in 225), a pre-write processing component (as in 235), a write head (as in 245), and a storage disc (as in 250).

Some embodiments further include a magnetic disc.

Some embodiments further include an optical disc.

Some embodiments further include that the write operation sequence data is comprised of a write command counter signal (as in 220).

Some embodiments further include the write operation sequence data as comprised of a clock signal (as in 315).

Some embodiments further include the write operation sequence data as comprised of a clock signal (as in 415) and a write command counter signal (as in 430).

Some embodiments further include a read head (as in 255), a recover sequence identification/user data component (as in 265), and a discard sequence identification component (as in 275).

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the attached claims are expressed. For example, the particular elements may vary depending on the particular application for the memory storage system while maintaining substantially the same functionality without departing from the scope and spirit of the present invention. In addition, although the preferred embodiment described herein is directed to a memory storage system for a magnetic disc drive, it will be appreciated by those skilled in the art that the teachings of the present invention can be applied to an optical drive, without departing from the scope and spirit of the present invention.

The invention claimed is:

1. A method of storing data comprising:
    receiving data to be stored on a data storage device that permits random access of data storage sectors;
    generating a write operation sequence indicator uniquely identifying a write operation as against all other write operations performed on the data storage device;
    combining the write operation sequence indicator with the data to obtain a complex data sequence, wherein error detection information for the combined write operation sequence indicator and the data is included in the complex data sequence; and
    storing the complex data sequence to the data storage device,
    wherein generating a write operation sequence indicator comprises:
    incrementing a write operation counter once for each write command which is received, and wherein generating a write operation sequence indicator comprises:
    incrementing a power-up counter once for every time the disk drive is powered up.

2. A data storage device comprising:
    means for receiving data to be stored on the data storage device that permits random access of data storage sectors;
    means for generating a write operation sequence identifier;
    means for combining the write operation sequence identifier with user data to obtain a complex data sequence, wherein error detection information for the combined write operation sequence identifier and the user data is included in the complex data sequence; and
    means for writing the complex data sequence to a data storage medium of the data storage device.

3. The data storage device of claim 2 wherein the data storage medium comprises:
    a magnetic disc.

4. The data storage device of claim 2 wherein the data storage medium comprises:
    an optical disc.

5. The data storage device of claim 2 wherein the means for generating comprises:
    a write command counter.

6. The data storage device of claim 2 wherein the means for generating comprises:
    a clock.

7. The data storage device of claim 2 wherein the means for generating comprises:
    a clock; and
    a write command counter.

8. A method of storing data on a data storage medium in a data storage device, the method comprising:
    receiving data to be written to the data storage medium during a write operation; and
    generating a write operation sequence indicator uniquely identifying the write operation as against all other write operations performed on the disc, wherein generating the write operation sequence indicator comprises:
    incrementing a power-up counter once for every time the data storage device is powered up;
    incrementing a write operation counter once for each write command which is received; and
    combining at least one count value obtained from the power-up counter with at least one count value obtained from the write operation counter to obtain the write operation sequence indicator.

9. The method of claim 8 and further comprising:
    combining the write operation sequence indicator with the data to obtain a complex data sequence; and
    writing the complex data sequence to the data storage medium.

* * * * *